Jan. 14, 1969  JIRO ASAHINA  3,422,263
IONIZED AIR PRODUCING DEVICE

Filed Dec. 23, 1964

INVENTOR.
Jiro Asahina
BY Michael S. Striker
Attorney

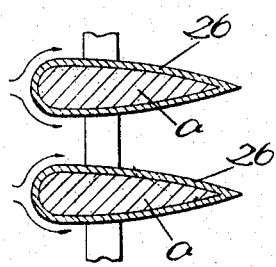
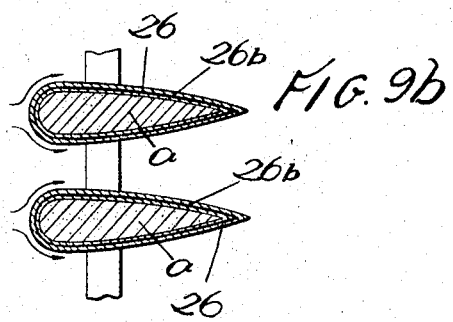
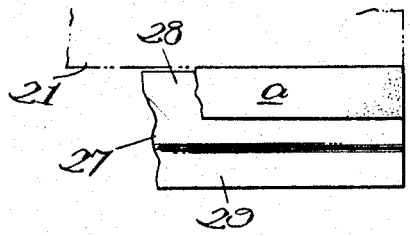
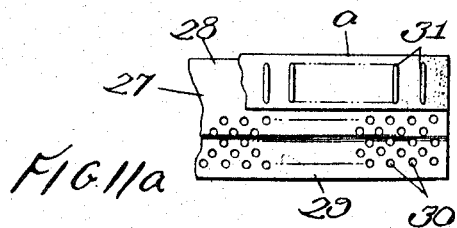

United States Patent Office 3,422,263
Patented Jan. 14, 1969

3,422,263
IONIZED AIR PRODUCING DEVICE
Jiro Asahina, 1402 Yamanouchi, Kamakura-Kanagawa Prefecture, Japan
Filed Dec. 23, 1964, Ser. No. 420,644
Claims priority, application Japan, Dec. 30, 1963, 38/71,358, 38/71,359; May 15, 1964, 39/37,502; Oct. 8, 1964, 39/57,058
U.S. Cl. 250—44     7 Claims
Int. Cl. G01n *21/26;* G01n *23/12;* G21h *5/00*

ABSTRACT OF THE DISCLOSURE

A device for producing ionized air containing only negatively charged ions and mainly comprising passage means confining a stream of air passing therethrough, a radiation emitting body located in the passage means, and negatively charged screen means downstream of the radiation emitting body so that an air stream passing through the passage means is ionized by contact with the radiation emitting body and positive ions in the thus ionized air stream are caught by the screen means so that the air stream emanating from the passage means will contain only negatively charged ions.

---

The present invention relates to an ionized air producing device provided with a radiation emanating body which can emanate radioactive rays such as alpha or beta rays.

One of the objects of the present invention is to supply an apparatus such as an air conditioner, a heating or cooling apparatus, or an electric fan that aims to control the atmospheric condition chiefly by means of producing the flow of air, with an ionized air producing device which can safely, simply and efficiently ionize the air.

Another object of the present invention is to provide an ionized air producing device which is devised so that it can control selectively in accordance with the necessity or necessarily the production of positive ions on one hand and can increase the production of negative ions on the other hand.

Further another object of the present invention is to provide an ionized air producing device which can ionize the air by means of ionizing efficiencies given by a radiation emanating body provided therein and comprising radioactive elements such as radium and thorium which are obtainable from monazite and can emanate alpha or beta rays, and synthetic resins forming said body with said elements in a desired shape.

Still further another object of the present invention is to provide an ionized air producing device which can be provided closely in front of a rotary member of an atmospheric condition controlling apparatus which produces the flow of air, so that the device may efficiently contact with said flow for ionizing the air in the stream, or which can be provided to the rotary member itself so that radioactive rays may efficiently and centrifugally be emanated therefrom on account of centrifugal forces exerted to the rotary member and concurrently to the device.

Still further object of the present invention is to provide an ionized air producing device, wherein the outer surface of a radiation emanating body provided therein and comprising radioactive elements is protected by a covering material having radioactive permeability and high durability, so that the radioactive elements may not be dispersed therefrom and the device may be highly safeguarded.

And, still further object of the present invention is to provide an ionized air producing device which can supply us with sufficiently ionized air forming an air stream which flows in a constant direction.

Figure 1:
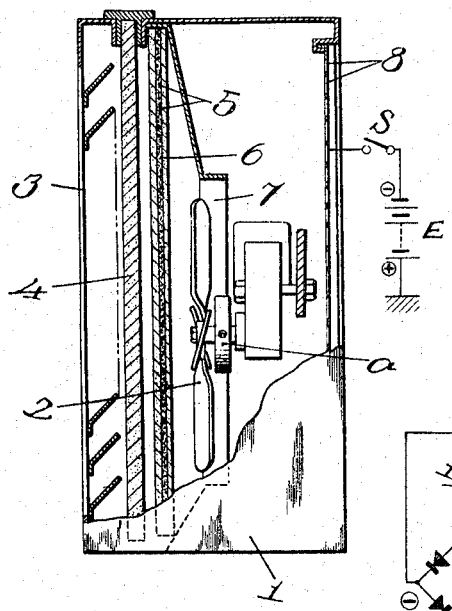
Figure 3:
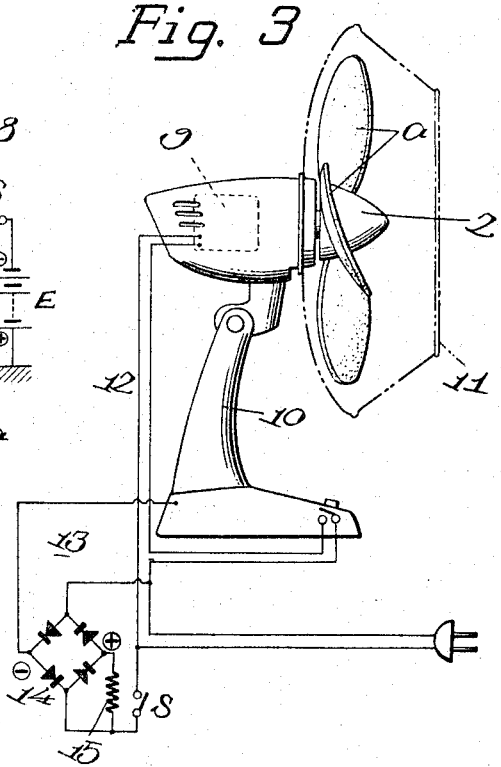
Figure 2:
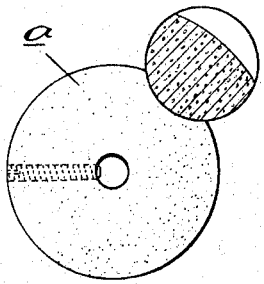
Figure 4:
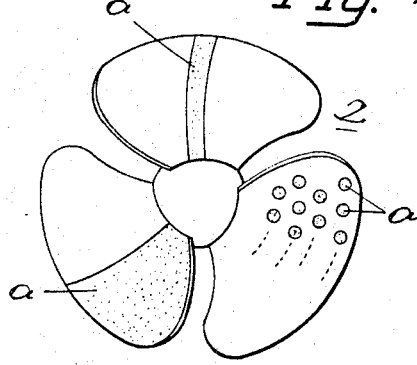
Figure 5:
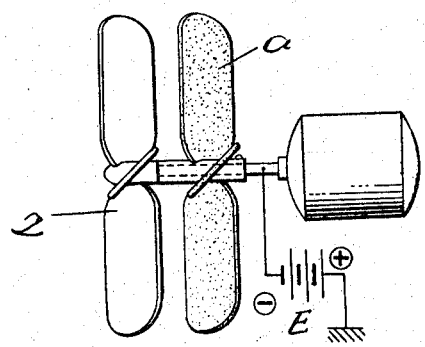
Figure 6:
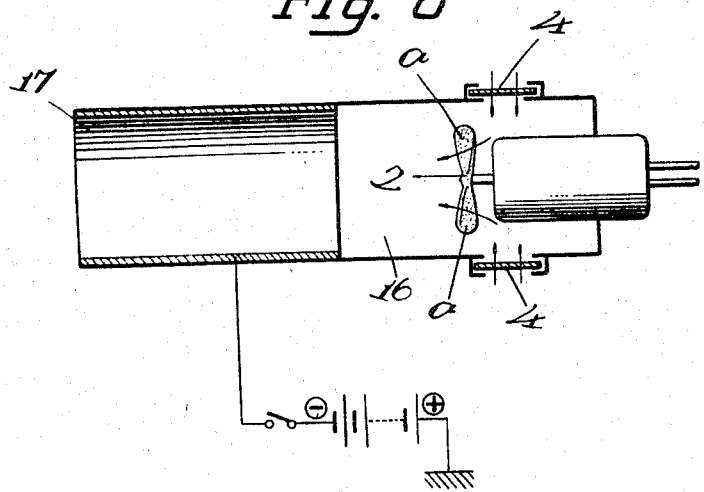
Figure 7:
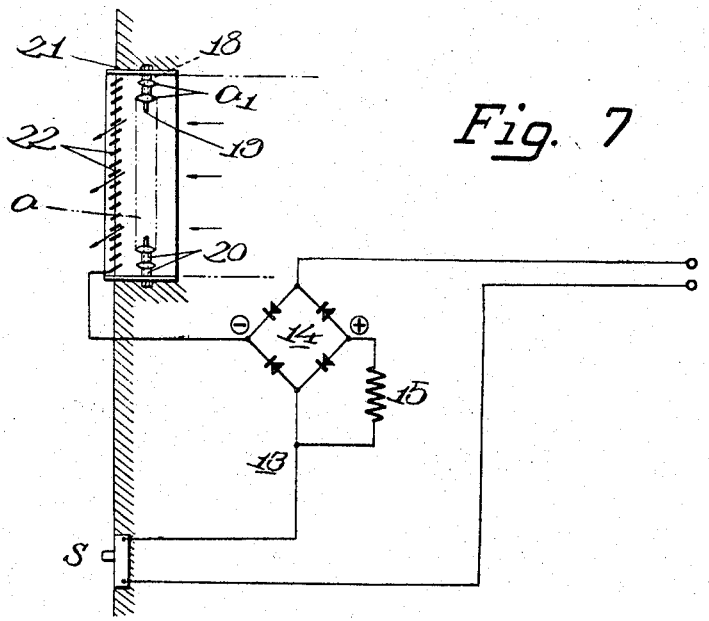
Figure 8A:
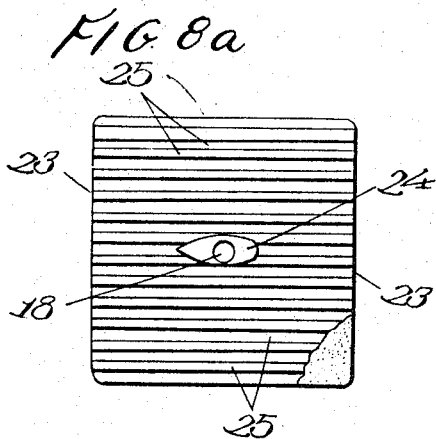
Figure 12A:
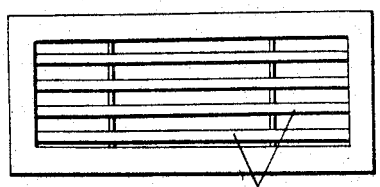
Figure 13A:
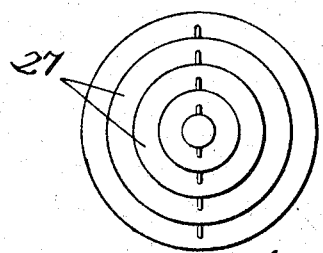

In the accompanying drawings in which various embodiments of the present invention and modifications thereof are illustrated:

FIG. 1 is a partly cut open side view of a small type air producing device of the present invention, FIG. 2 is a front view of the principal parts of the device shown in FIG. 1, which is enlarged and partly cut open for better references, FIGS. 3 to 6 show the embodiments in which the present invention device is provided on a rotary member itself, FIG. 3 particularly illustrating a side view of the device provided on a fan, FIG. 4 a front view of FIG. 3, FIG. 5 particularly illustrating a side view of the device provided in a fan having two sets of blades, namely, a front set of blades and a rear set of blades, and FIG. 6 showing a device provided on a cylindrical blower, FIG. 7 is a section view of the present device provided on a large type air conditioner, FIGS. 8*a, b* and *c* respectively show a plan view, side view and front view of a radiation emanating body illustrated in FIG. 6, FIGS. 9*a* and *b* are respectively enlarged section views of the principal parts of the two embodiments, wherein radiation emanating bodies are provided with protective safety means, FIGS. 10*a* and *b* show respectively a plan view of horizontal plates cooperating with the vent of an air conditioner and coated with a radiation emanating body in their part, and a section view thereof, FIGS. 11*a* and *b* show a partly cut open plan view of another embodiment of FIGS. 10*a* and *b,* and a section view thereof, FIGS. 12*a* and *b* and FIGS. 13*a* and *b* respectively show front views of FIGS. 10 and 11 in their practical employments, and section views thereof.

More detailed descriptions of the present invention are given hereinafter with reference to the embodiments illustrated in the accompanying drawings.

Firstly, in FIG. 1 wherein a small type ventilator is illustrated as an embodiment of the invention, a ventilating mechanism 2 such as an electrically motivated fan is provided in a box-type casing 1. Air drawn from an inlet vent 3 is firstly and preliminarily purified by means of passing through a filter 4 made of foamed plastics and removably connected to the casing 1. The air is further purified by passing through a secondary filter 6 fixed to the casing and impregnated with active carbon particles, and led through a funnel-shaped plates 7 toward a screen 8 provided in the front side of the casing 1.

A radiation emanating body *a* which is shaped circular for an instance as shown in FIG. 2, is tightly fixed to a rotary shaft of the ventilating mechanism 2 by proper means. The radiation emanating body *a* is formed by a mixture of synthetic resins and particles of monazite comprising radioactive elements such as radium and thorium which can emanate alpha or beta rays or both of them, said alpha or beta rays being able to produce ionized sanitary air on account of their efficiencies of making the latter ionized.

According to the present invention device the screen 8 provided in the front side of the casing 1 may be in the form of an electrically conductive metal screen insulated from said casing and charged with negative electricity so that only negative ions may pass through the screen 8 and positive ions may be attracted to the screen and discharged thereby of their negative electric charge, resulting in a flow of air vent from the ventilator which is only negatively ionized.

In FIG. 1 direct current is used in its electric circuit, wherein the anode of a battery E is grounded, whereas the cathode thereof is connected to the screen 8 so that the plate may intermittently be charged to negative by turning a switch S provided in the circuit on or off.

In FIGS. 3 and 4 other modifications of the present invention are illustrated wherein the present ionized air producing device is provided on a fan. A body part 10 of the fan which is provided with a motor 9, is further provided with blades 2 having a radiation emanating body $a$, so that the air vented by said blades may concurrently be ionized. The radiation emanating body $a$ maye be applied to the whole surface of the blades or may be applied partly to them as illustrated in FIG. 4. As shown in the embodiment illustrated in FIG. 1 and described in the above, a switching mechanism S which can selectively charge a guard net 11 solely to negative is provided. That is, wires 12 which are terminated to the body part 10 of the fan are connected to a circuit 13 provided with a direct current electric source 13 and having a commutator 14, the cathode of which being connected to said body part for negatively charging the latter and the anode thereof being connected through a resistance 15 to one of the wires 12 which is grounded.

In FIG. 5 a modification of the embodiment illustrated in FIG. 3 is shown, wherein a radiation emanating body $a$ is molded to the shape of fan blades and axially fitted to a rotary shaft of motor 9 at the rear of venting fan blades 2 which are coaxially fitted to the rotary shaft and made of electrically conductive metal plates. To said venting fan blades 2 the cathode of a direct current source such as a battery E may be connected so that an air flow mainly negatively ionized air and less of positively ionized air may be vented therefrom.

In FIG. 6 a cylindrical ionized air producing device of the invention is illustrated, which could be for use in automobiles or by hands when it is small-sized, and in ships, hotels or theaters when it is built to large-size. A cylindrical tubular body 16 is provided with a venting fan 2 having a radiation emanating body $a$ and filters 4 which clean up the flow of air sucked by said fan thereto prior to making the flow ionized. Further a cylindrical casing 17 charged with negative electricity and insulated from the body 17 is connected to the front opening end of the latter, so that the casing 17 may attract positive ions among ionized air and have them discharged, resulting in venting therefrom an air flow which is rich in negatively ionized air.

The embodiments described above have common features that all of their radiation emanating bodies $a$ are provided on rotary members which perform venting operations. In these constructions, the contact of radiation emanating bodies with the flow of air can remarkably be increased due to their own rotary movements and centrifugal forces exerted thereon and concurrently can increase the emanation of alpha or beta rays therefrom, so that ionized air producing efficiency of the device per unit of time and space may be increased.

On the other hand, in FIG. 7, an ionized air producing device of the invention which could be provided to an outlet vent of air conditioner in a building, is illustrated, wherein a radiation emanating body $a$ is made from a plurality of unit pieces $a_1$ which are coaxially penetrated by a supporting bar 19 and fitted thereto. Tubular bodies 20 having equal lengths are arranged about the bar between each of the unit pieces $a_1$ so that the unit pieces of the radiation emanating body $a$ may be placed coaxially to the bar at uniform intervals. One or more radiation emanating bodies constituted by said unit pieces $a_1$ are horizontally or vertically fitted within a casing 1 provided to an outlet vent which opens at a wall of room in the building. The casing 1 is further provided with metallic wing plates 22 at its open end, said metallic wing plates being connected to a circuit as shown in FIG. 3 so that when an alternate current source is employed thereto, or to a circuit as shown in FIG. 1 so that when a direct current source is employed thereto the plates 23 may be charged with negative electricity. In this embodiment, the flow of air cleaned up and vented by an air conditioner can smoothly pass through the intervals between the unit pieces $a_1$, whereby the air can contact with the radiation emanating bodies of the pieces $a_1$ and can sufficiently be ionized.

Figure 8C:
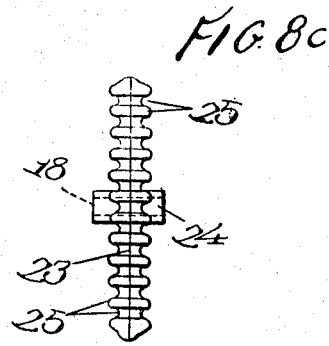
Figure 8B:
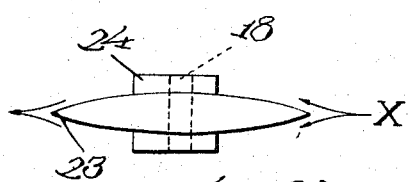

In FIGS. 8a, b, and c, a preferable modification of the unit piece $a_1$ shown in FIG. 7 is illustrated. A radiation emanating unit piece in FIG. 8 is constructed as a plate having sharp edges 23 along with the direction X of the flow of air, a flange 24 streamlined at its both edges to meet with the direction of the flow of air and provided with a hole 18 in its center for the insertion of a supporting bar, and a plurality of concave and convex grooves provided on the surface of the plate in parallel with the direction of the flow of air, so that the radiation emanating unit piece may be streamlined as a whole. This construction will not only prevent irregular flows of air passing therethrough but also the reduction of ionization which would result when positive and negative ions collide with each other due to irregular flow of air.

In all the embodiments thus described and illustrated, the radiation emanating bodies are molded in certain shapes. That is, radioactive elements extracted and refined from natural ores which emanate alpha or beta rays such as cobalt, radium, or thorium, or refined particles of monazite are mixed with synthetic resins which do not absorb radioactive rays, and molded into desired shapes, the molded articles being further mechanically finished either by polishing with emery powders, or cutting so that rough outer surfaces cropping out radioactive elements contained therein may be obtained. In case where polyester resins are used as a constituent of the mixture, a chemical treatment of the molded articles with alkaline solution such as ammonium solution is preferable to mechanical finishing of the articles, and in case of melamine resins, thinner solution is preferable.

Because it is known that radioactive elements of this kind are most dangerous to humans when they are absorbed into their bodies even at a minimum rate and apt to induce various troubles to them since the radioactive effects of these elements remain considerably long; it is preferable to cover the outer surfaces of the molded articles completely with a covering material having lasting quality and radioactive permeability. Thus providing, radioactive elements may be prevented from the dispersion and the safeguarded safely and perfectly from distortions, fires and weathering.

The means by which a radiation emanating body $a$ is covered are illustrated in FIGS. 9a and b. In FIG. 9a the outer surface of the body $a$ is covered with a covering material such as nitro-cellulose which can permeate radioactive rays but does not absorb them. In FIG. 9b, the radiation emanating body $a$ is further covered with an auxiliary covering 26b such as textiles made from synthetic fibers, cottons or silks.

FIGS. 10 to 13 illustrate embodiments of the invention, in which a radiation emanating body is composed of coatings of radio active elements on parts of the device. Particularly in FIGS. 10 and 11, coats of radiation emanating material $a$ are directly applied to base parts 28 of wing fins 27 provided in layers at vent openings of a conventional ventilator, air conditioner, or other heating or cooling apparatus. Bent parts 29 of the wing fin 27 are negatively charged so that said parts may attract positive charges of positively ionized air. In FIG. 11, the bent part 29 is perforated with a number of apertures which allow the flow of air to pass therethrough. The radiation emanating body with the flow of air may widely be increased.

Figure 12B:
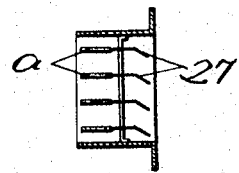
Figure 13B:
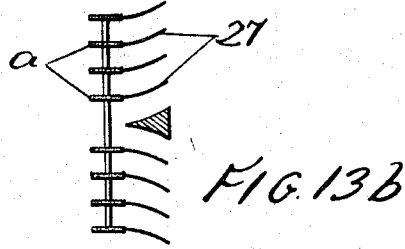

In FIGS. 12 and 13, a plurality of the wing fins 27 illustrated in FIGS. 10 and 11 are combined in parallel or concentrically into a set which may be removably provided to a vent opening of conventional air conditioners.

The radiation emanating bodies $a$ illustrated in FIGS.

10 to 13 are made by coating on a desired portion a liquified coating material prepared by mixing a solvent with a mixture of fine particles of synthetic resins such as phenol or urea resins which do not absorb nor prevent radioactive rays and a moderate amount of radioactive elements which would not affect the health and are refined from ores emanating alpha or beta rays such as cobalt, radium or thorium, or monazite particles. The coated materials are mechanically or chemically treated after they are dried so that they may have rough surfaces with radioactive elements appearing on them.

Whereas a number of preferable embodiments of the present invention has been described with reference to the drawings, it is to be noted that various other modifications may be made within the constructions claimed in the claims appended hereinafter.

Various ionized air producing apparatuses, in which electrical means such as discharging at high voltage exemplified by a corona discharge is generally utilized, have recently been developed.

But most of them have disadvantages that mass amount of ozones is apt to be produced therein when a continuous electric discharge is performed and they are attended with deficiencies of attracting dusts. Moreover, their manufacturing costs become comparatively high because of their complexed structures. And, compared to their high prices and complexed structures, their capacities of producing healthy flow of air are poor, since, due to the necessity of insulating the outer case from the dangerous high voltage discharger contained in the former, their outer casing are made from synthetic resin plates which are apt to be negatively charged and attract negative ions, resulting in supplying us with the flow of air being full of positive ions.

It is known that man's respiratory function is maintained to twenty percent by breathing through the nose and to eighty percent by breathing through the skin. In the view point of static electrology, human bodies are charged with positive electricity, hence in the skin respiration the oxygen which is negatively charged may be attracted and absorbed into the body easier than the positively ionized oxygen.

Therefore, it may be considered that skin respiration becomes low when the amount of negatively ionized oxygen become less in the air, and concurrently the breathing through the nose has to be increased resulting in making the body fatigued. In addition to the above efficiencies the negatively ionized oxygen can afford to the human, it can also make the blood alkaline under pH 7 and expand blood capillaries, resulting in inducing high anagensis.

Thus described, the device of the present invention has a number of better efficiencies superior to conventional ionizing apparatuses both mechanically and economically.

What is claimed is:

1. An ionized air producing device comprising, in combination, passage means confining a stream of air passing therethrough; fan means in said passage means for producing said air stream, said fan means having a plurality of fan blades; a radiation emitting body covering at least part of the surfaces of said blades which extend transverse to the direction of the air stream; and a single negatively charged screen means downstream of said radiation emitting body whereby an air stream passing through said passage means is ionized by contact with said radiation emitting body and positive ions in the thus ionized air stream are caught by the screen means so that the air stream emanating from said passage means will contain only negatively charged ions.

2. A device as defined in claim 1, wherein said radiation emitting body is formed by a mixture of radioactive elements and synthetic resins.

3. A device as defined in claim 2, wheerin said body is covered by a covering material through which the rays emitted by said body may permeate without being absorbed.

4. A device as defined in claim 3, wherein said covering material is nitro-cellulose.

5. A device as defined in claim 2, wherein said body has a rough outer surface.

6. A device as defined in claim 1, wherein said fan blades are molded from a mixture of radioactive elements and synthetic resins.

7. A device as defined in claim 1, wherein said negatively charged screen means comprise a metal screen extending transverse through said passage means.

References Cited

UNITED STATES PATENTS

| | | | |
|---|---|---|---|
| 2,745,969 | 5/1956 | Keller | 250—106 X |
| 2,934,648 | 4/1960 | Leupi et al. | 250—44 |
| 3,110,811 | 11/1963 | Kramishi | 250—106 |
| 3,154,682 | 10/1964 | Hartz et al. | 250—44 |
| 3,182,194 | 5/1965 | Fish et al. | 250—44 |
| 3,264,473 | 8/1966 | Levin et al. | 250—44 |
| 2,594,777 | 4/1952 | Hicks | 250—44 |
| 2,683,813 | 7/1954 | Friedman | 250—106 X |
| 3,191,094 | 6/1965 | Kleinhans | 250—44 X |
| 3,295,651 | 1/1967 | Klackowski et al. | 250—106 X |
| 3,311,108 | 3/1967 | Cristofv et al. | 250—44 X |

ARCHIE R. BORCHELT, *Primary Examiner.*

U.S. Cl. X.R.

250—106